(12) United States Patent
Chan et al.

(10) Patent No.: US 10,722,771 B2
(45) Date of Patent: Jul. 28, 2020

(54) SYSTEM AND METHOD FOR TRACKING AND OPTIMIZING PIN HOLE LOCATIONS ON A PUTTING GREEN

(71) Applicant: STEVENS WATER MONITORING SYSTEMS, INC, Portland, OR (US)

(72) Inventors: Chun Kit Chan, Clackamas, OR (US); Michael Kuvelas, Vancouver, WA (US); Carmen Magro, Wynnewood, PA (US); Scott South, Vancouver, WA (US)

(73) Assignee: Stevens Water Monitoring Systems, Inc., Portland, OR (US)

( * ) Notice: Subject to any disclaimer, the term of this patent is extended or adjusted under 35 U.S.C. 154(b) by 206 days.

(21) Appl. No.: 15/441,015

(22) Filed: Feb. 23, 2017

(65) Prior Publication Data

US 2017/0239540 A1 Aug. 24, 2017

Related U.S. Application Data

(60) Provisional application No. 62/298,883, filed on Feb. 23, 2016.

(51) Int. Cl.
| | | |
|---|---|---|
| *A63B 57/50* | (2015.01) | |
| *G01S 19/19* | (2010.01) | |
| *G01S 5/02* | (2010.01) | |
| *G01C 15/06* | (2006.01) | |
| *G01C 15/00* | (2006.01) | |

(52) U.S. Cl.
CPC .............. *A63B 57/50* (2015.10); *G01C 15/06* (2013.01); *G01S 5/02* (2013.01); *G01S 19/19* (2013.01); *A63B 2220/12* (2013.01); *A63B 2225/50* (2013.01)

(58) Field of Classification Search
CPC ........... A63B 57/50; G01S 5/02; G01S 19/19; G01C 15/00
See application file for complete search history.

(56) References Cited

U.S. PATENT DOCUMENTS

| | | | |
|---|---|---|---|
| 4,192,510 A | * | 3/1980 | Miller .................... A63B 69/36 473/157 |
| 5,668,306 A | | 9/1997 | Doherty et al. |
| 5,736,631 A | | 4/1998 | Dixon et al. |

(Continued)

*Primary Examiner* — David L Lewis
*Assistant Examiner* — Robert E Mosser
(74) *Attorney, Agent, or Firm* — FisherBroyles LLP; Kevin D. Jablonski (57) ABSTRACT

A system and method for more efficient tracking and automatically recommend an optimizing pinhole locations on putting greens are disclosed. In one embodiment, a system and method may be directed to identifying a global position of a pinhole location using a turf analysis device having a global positioning system (GPS) module configured to collect and assimilate pinhole location data and condition data to a server database. The server may then determine an optimal location of a new pinhole location based on all previously collected pinhole location data and all previous condition data. By tracking and analyzing the pinhole locations for one or more greens as well as corresponding condition data, follow-on pinhole locations can be optimized. In some embodiments, measurements of turf conditions may be used to influence the optimization of determining pinhole location.

12 Claims, 5 Drawing Sheets

(56) References Cited

U.S. PATENT DOCUMENTS

| | | | |
|---|---|---|---|
| 5,886,253 A | 3/1999 | Joustra et al. | |
| D418,073 S | 12/1999 | Kreutzer et al. | |
| 6,171,199 B1 * | 1/2001 | Cohodas | A63B 57/00 |
| | | | 473/131 |
| 6,601,440 B1 | 8/2003 | Chuang et al. | |
| 6,826,972 B2 | 12/2004 | Clark et al. | |
| 7,106,076 B2 | 9/2006 | Tillmann et al. | |
| D616,314 S | 5/2010 | Akomolede et al. | |
| 8,656,759 B2 | 2/2014 | Hughes et al. | |
| 9,952,327 B2 | 4/2018 | Schultz | |
| 2005/0024213 A1 | 2/2005 | Franzen et al. | |
| 2012/0084115 A1 * | 4/2012 | Cline | A01G 25/16 |
| | | | 705/7.27 |
| 2012/0109387 A1 | 5/2012 | Martin et al. | |
| 2013/0308426 A1 | 11/2013 | Scarlatti et al. | |
| 2015/0309496 A1 | 10/2015 | Kah, III et al. | |
| 2015/0323491 A1 | 11/2015 | Miller et al. | |

* cited by examiner

SYSTEM AND METHOD FOR TRACKING AND OPTIMIZING PIN HOLE LOCATIONS ON A PUTTING GREEN

PRIORITY CLAIM AND CROSS REFERENCES TO RELATED APPLICATIONS

The present application claims priority and benefit from the U.S. Provisional Patent Application No. 62/298,883, filed Feb. 23, 2016 and titled, "SYSTEM AND METHOD FOR TRACKING AND OPTIMIZING PINHOLE LOCATIONS ON A PUTTING GREEN". The entire content of the provisional application is herein expressly incorporated by reference. Further, the present application refers a commonly-assigned U.S. patent application Ser. No. 15/441,023, entitled "SYSTEM AND METHOD FOR DETERMINING TURF PERFORMANCE INDICATORS" filed on Feb. 23, 2017, and commonly-assigned U.S. patent application Ser. No. 15/440,998, entitled "SYSTEM AND METHOD FOR INSTANTANEOUSLY DETERMINING UNIFORM DISTRIBUTION OF WATER, SALINITY, CONDUCTIVITY, TEMPERATURE AND OTHER CONDITIONS IN SOIL" filed on Feb. 23, 2017, the disclosures of which are incorporated by reference.

BACKGROUND

Golf is a sport enjoyed by millions of people the world over. Its popularity indicates that interest in golf remains vibrant and growing. As a result, golf courses and groundskeepers are always seeking to enhance the playing experience for golfers while increasing efficiencies in maintaining fairways and putting greens. Many variables may affect turf quality including water absorption, water retention, soil content, salinity influences, weather, and use patterns. Thus, groundskeepers are continuously monitoring various conditions in an effort to maintain or improve the quality of the turf in fairways and greens.

One particular area of which groundskeepers are keenly aware involves the specific location in which a pinhole, or cup, is placed on various putting greens. Experienced groundskeepers who take care of putting greens at discerning golf courses seek to move the pinhole often to avoid over usage of specific areas of the putting greens. If a particular pinhole location is used too often, then the areas of the putting green surrounding the often-used pinhole location become downtrodden and worn at a faster rate than other areas. Such over usage can adversely impact the turf's health and quality. Keeping track of former pinhole locations on putting greens becomes problematic as old pinhole locations are filled back in and eventually grow back to being unrecognizable as a former pinhole location. Conventional reporting on pinhole location is a manual process. Correlation of pinhole location with turf conditions involves educational judgment and memory recall of past conditions.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. The systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, the subject matter disclosed herein may be directed to systems, apparatuses, and methods for using a turf analysis device for tracking and optimizing putting green pinhole locations (often referred to as "pinhole," "cup," or "hole" locations—but called pinhole hereinafter) over the course of time. Groundskeepers at golf courses vary the location of each green's pinhole sometimes as much as daily. When a pinhole is located at one spot on a green for too long, the putting surface around the pinhole becomes trodden from repeated use and traffic. As a result, the area of a green around the pinhole wears faster than other portions. Thus, groundskeepers try to vary the location often to avoid down trodden sections. However, tracking where and when such pinhole changes occur is often done on a manual basis on a paper document called a "Pin Sheet". Determining the placement of a pinhole may be accomplished on a rotational based using the Pin Sheet, by memory, educational judgment, or feel by the groundskeepers. The impact of the turf quality and health in determining the pinhole location is generally not assessed. Thus, various portions of greens often go unused or overused, or used at the wrong time, because of the inexact nature of judgment, memory, and feel. Daily changes of a pinhole location on each putting green benefit from centralized tracking so that a groundkeeper can communicate changes to golfers and golf course management.

In order to more efficiently track and eventually optimize pinhole locations, a groundskeeper may use a GPS-enabled turf analysis device when the pinhole locations are being selected. Thus, a groundskeeper, when placing a hole for the first time using the methods discussed below, the GPS location of the pinhole is pinpointed with longitudinal and latitudinal coordinates. The device may further provide a time and date stamp as well as additional data of the putting green such as turf quality (turf quality may be an indicator or overall turf condition based on a number of physical and temporal characteristics). This data may be assimilated at a server computer where the pinhole location data can be tracked over time for each putting green. After enough iterations, an analytical optimization method may then be used to automatically determine an optimized pinhole location for next use. Such optimization may be influenced by traffic and patterns of use, past location history, turf quality, slope/contour, weather, time of year, and various other factors. Each putting surface and pinhole location may then be tracked, optimized and displayed across several output programs, such as a clubhouse display or a scorecard-printing machine. These and other advantages will become more apparent in the detailed descriptions below with respect to FIGS. 1-5.

Figure 1:
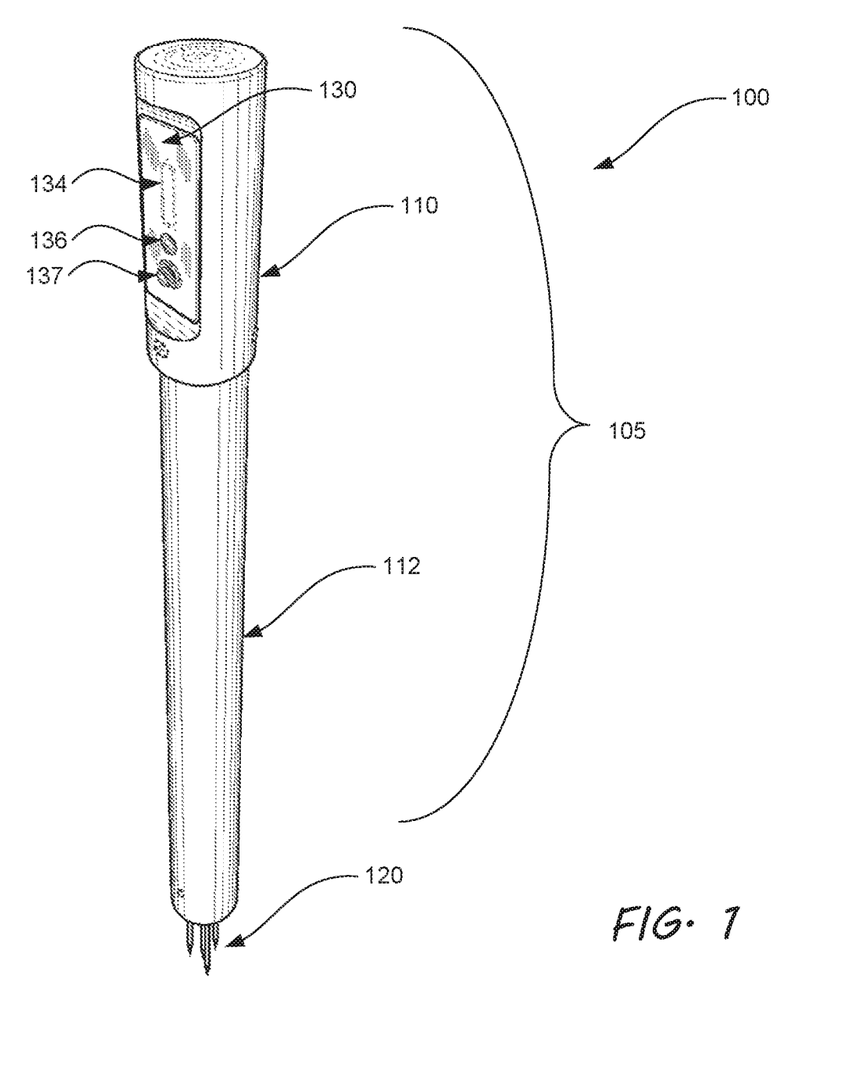
FIG. 1 is a device for performing turf analysis and pinhole tracking according to an embodiment of the subject matter disclosed herein.

FIG. 1 is a diagram of a turf analysis device 100 for performing turf analysis and pinhole location tracking according to an embodiment of the subject matter disclosed herein. The device 100 may be embodied in an elongated housing 105 that may be cylindrical in nature. The housing 105 may include an upper portion 110 that is slightly larger in circumference than a lower portion 112. The lower portion 112 may also be tapered. Below the surface of the flat area 112 is a rechargeable battery for providing power to the device 100. The housing may have a length between six inches and three feet.

The housing may includes four prongs 120 at a bottom end of the lower portion 112. The four prongs 120 include a pointed end designed to penetrate the surface of turf, such as a putting green or a fairway. The prongs may be conductively coupled to integrated electronics (not shown in FIG. 1) in the interior of the device 100. The prongs coupled with integrated electronics becomes a sensor that may determine specific physical aspects of the turf, such as water content, conductivity, temperature, and the like. The sensor's measurements are described in commonly assigned U.S. patent application Ser. No. 15/440,998 entitled "System and Method for Instantaneously Determining Uniform Distribution of Water, Salinity, Conductivity, Temperature, and Other Conditions in Soil, filed on Feb. 23, 2017, the disclosure of which is incorporated by reference. When the prongs 120 are engaged with the turf, the device 100 may stand upright on its own.

The flat area may, in and of itself, be a display 134 (such as an LED display, for example) for displaying display data as the data is being collected. The display 134 may show additional data such as coordinates of the current location and battery life remaining. The flat area may include a software-based or hardware-based power button 136 for turning the device 100 on and off. The flat area 130 may include an interface 137 for recharging the battery. Additional features of the device 100 are shown in the block diagram of FIG. 2.

Figure 2:
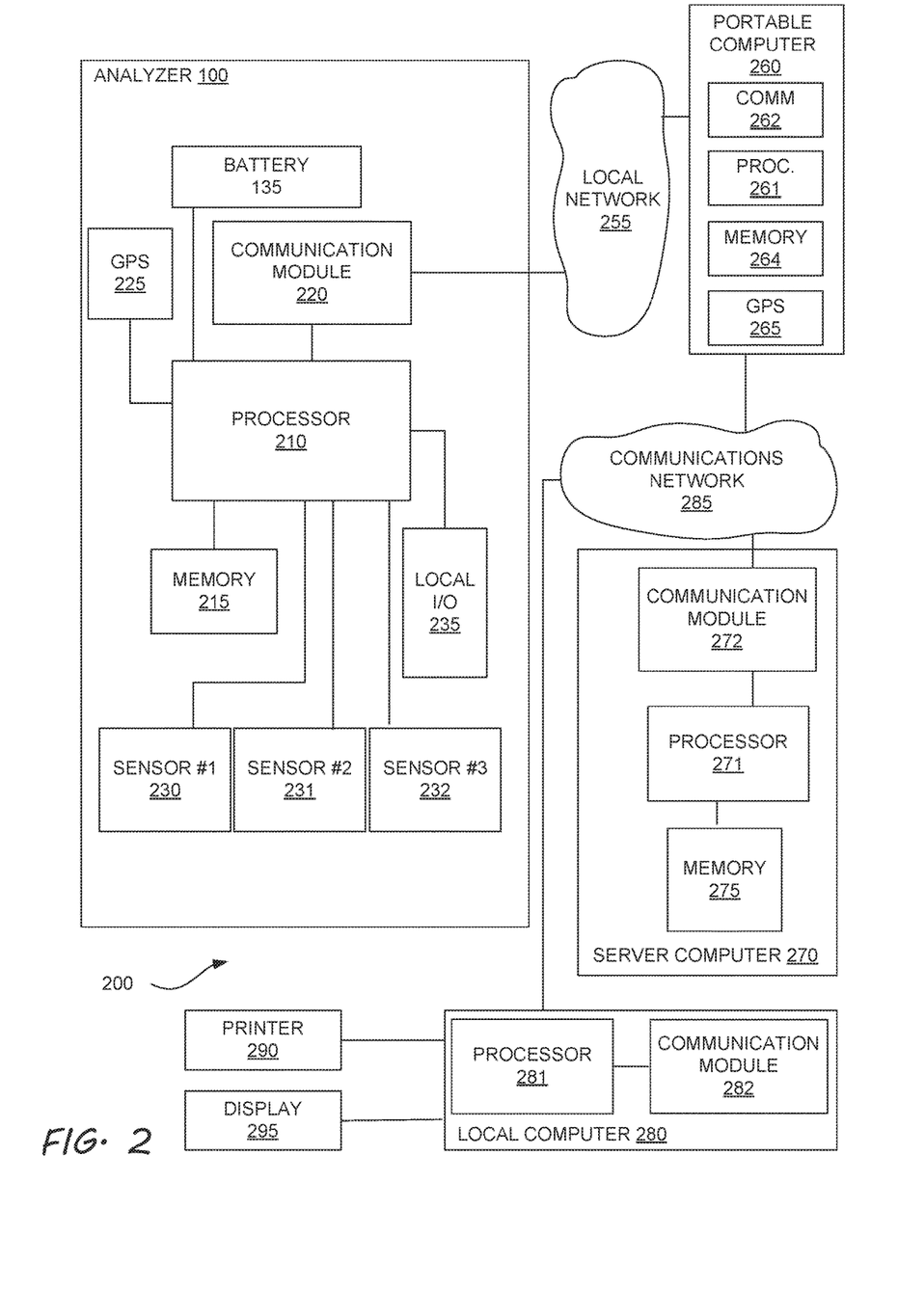
FIG. 2 is a system for using the turf analysis device of FIG. 1, according to an embodiment of the subject matter disclosed herein.

FIG. 2 is a system 200 for using the turf analysis device 100 of FIG. 1, according to an embodiment of the subject matter disclosed herein. The system 200 includes the turf analysis device 100, a local portable computing device 260, a server computer 270, and a local computer 280 that may be coupled to an external display 295 and a printer 290. As briefly mentioned previously, the turf analysis device 100 includes a processor 210 and a local memory 215 that may store instructions that may be executed by the processor 210. The memory 215 may also store data collected by various turf quality measurements via sensors such as water content sensor 230, conductivity sensor 231, and temperature sensor 232; data collected from the GPS module 225; and battery health conditions. Further, local I/O 235 is coupled to the processor 210 and may be a power button or a display as discussed above. The processor 210 and other components may be coupled to the battery 135 for provision of power.

In this embodiment, there are three sensor measurements from the three sensors 230, 231 and 232 shown but there may be more or fewer depending on application and model. The four prongs 120 (FIG. 1) provide a means for engaging with the surf and soil below the surface of the turf. These four prongs work together in measuring a number of turf quality conditions. The measurements from measurement sensors 230, 231, and 232 may include a soil moisture content, and electric conductivity, a temperature of turf surface, a temperature sensor of soil, a humidity sensor, or any other measurements and sensors that may be useful in determining data about soil or turf.

The turf analysis device 100 includes various interfaces for engaging exterior computer networks. A first interface is a communication module 220, which may be communicatively coupled to communication module 262 for providing a communication link between the turf analysis device 100 and one or more remote computing devices, such as portable computer 260. In one embodiment, the communication modules 220 and 262 may be wireless network adapters for Wi-Fi interconnectivity using IEEE-802.xx standards and TCP/IP protocol. In other embodiments, the communication modules 220 and 262 may be short-range network modules for using BlueTooth™ and the like. In still further embodiments, the communication module 262 may be a cellular network device for engaging one or more Long-Term Evolution (LTE), e.g., cellular, networks. These communication modules 220 and 262 may communicate through a local communication network 255, such as a Near Field Communication (NFC) Network or a BlueTooth™ Wireless network, as discussed in the embodiments above.

Another interface for engaging another computer network is the Global Position System (GPS) module 225 that may be integrated with the turf analysis device 100. The GPS module may be configured to engage the Global Positioning System whereby a space-based navigation system provides location, altitude, and time information in all weather conditions anywhere on or near the Earth when the device can connect to a computer network where there is an unobstructed line of sight to four or more GPS satellites determining location. The GPS module 225 may link directly to the GPS satellite network or may link to other networks (such as an LTE network). The GPS module 225 provides data, typically in the form or longitudinal and latitudinal coordinates as well as altitude in terms of distance from sea level. The GPS data may be assimilated with sensor data by the processor 210 and then communicated via the communication module 220 to the local remote portable computer 260. The GPS data may also be assimilated by portable computer 260 that have integrated GPS module 265.

The portable computer 260 may be any number of mobile computing devices such as a smart phone, a tablet, a laptop computer and the like. The portable computer 260 may typically include one or more local processors 261, communications modules 262, and memories 264 for sending, receiving and storing data as well as execution applications. Local memory 264 may store instructions that may be communicated to and executed by the processor 210 at the analyzer 100. The portable computer 260 may also include an integrated GPS module 265, battery (not shown), and display (also not shown). The memory 264 may also store data collected by various sensor measurements such as measurements 230, 231, and 232, data collected from the GPS module 225 or 265, and battery health conditions. In the system 200 of FIG. 2, the portable computer 260 may be configured to execute a pinhole tracking and optimization application to be used in conjunction with the turf analysis device 100.

The pinhole tracking and optimization application may track and locally store data in memory 264 about golf green pinhole locations and link GPS locations to the application using an integrated GPS module 265 or application for wirelessly linking to a more accurate GPS location device such as GPS module 225. The application may be configured to log pinhole locations and automatically link such location information to a centralized software-program. The logged information includes date/time, latitude, longitude, altitude, turf quality measurements, picture and/or electronic notes inputted by user for each golf green and golf green's pinhole location. The application may also track historical trending of pinhole location per golf green. Such historical location information is selectable by user. The application may be configured to guide and warn a groundskeeper of optimal placement location. Further, the application provides a means for administrative reporting of pinhole locations for golf course management and that may be used to update a course map in a clubhouse.

Upon collection of enough historical data, the application may be used to animate pinhole position over user defined data history that is viewable on-line via software as a service platform. Further, the current golf pinhole location may be overlaid on a Geographic Information System (GIS) location satellite image and may include measurement layers of soil moisture, electric conductivity, temperature, irrigation coverage and other measurements that affect turf conditions. Further yet, the application may be used by golfers to calculate distance to the pinhole location from the fairway location (or even adjacent hole fairways as is sometimes the case for some golfers).

The system 200 may further include a server computer 270 for storing data collected remotely and for assimilating turf conditions and pinhole location data over the course of time. The server computer may be communicatively coupled to the portable computer through various means using the communication network 285, which may be a cellular or Internet network. Thus, the application(s) discussed above may be cloud-based utilizing a virtual server processor 271 having a local memory 275 through a local communications module 272.

The system 200 may include local computer 280 that includes a communication module 282 for connection to the server computer 270 via the communications network 285 and provides a local display (not shown) to interact with information and features of the system 200. A printer 290 for printing pinhole location maps and pin sheets may connect to the local computer 280. A display 295 for displaying pinhole location maps may similarly connect to the local computer 280. One or more applications may include a printing program that is linked to each golf course golf hole and respective golf green pinhole locations based on the most recently logged GPS location. Integrating the GPS pinhole locating system with a cloud-based service for controlling the printer 290 enables the golf course club house to print customized score cards that show the current pinhole location for the day and enables golfers to print out the pinhole location at any printer prior to arriving at the golf course. Further, additional data may be printed on a golf card or displayed at a remote display 295 in a clubhouse such as historical pinhole locations and respective effects on handicap, players' names, players' handicaps, marketing information from the golf course, current weather conditions and forecast, and the like.

Figure 3:
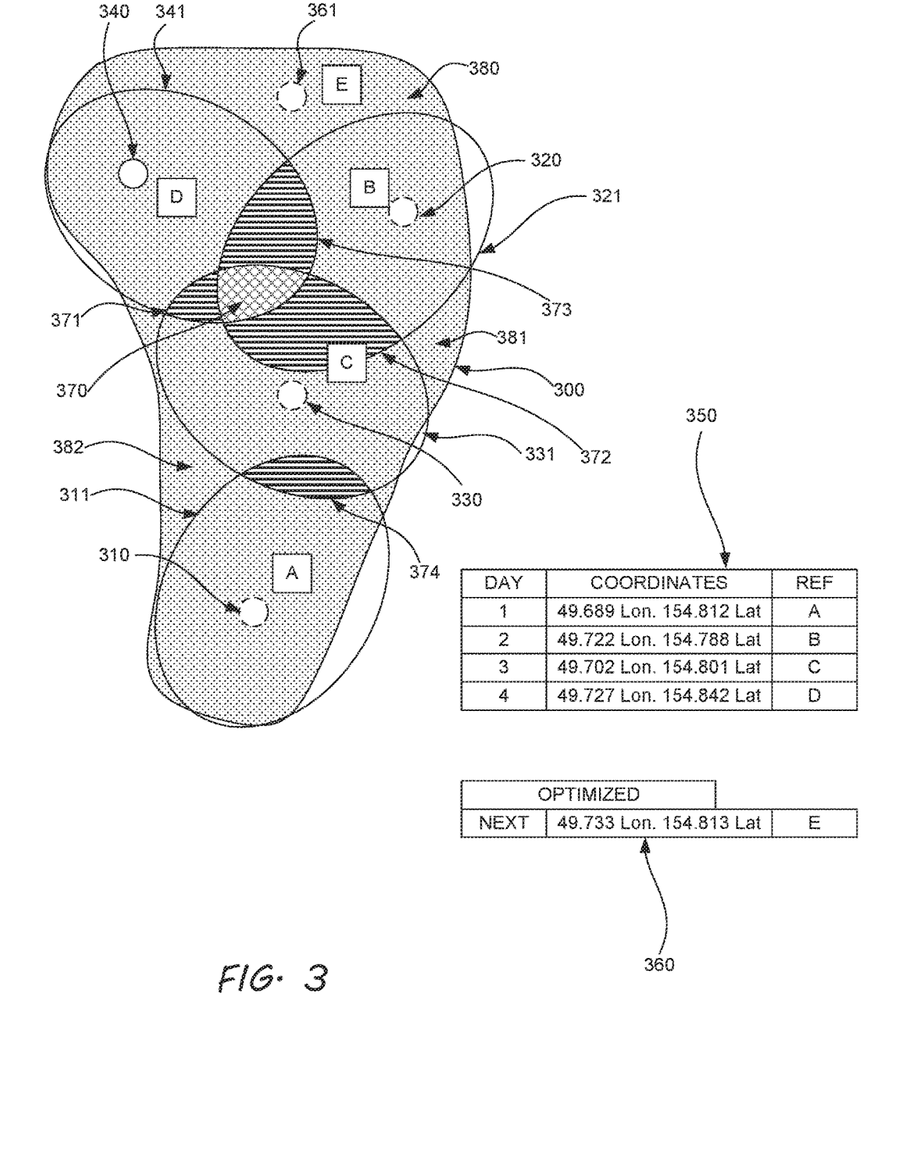
FIG. 3 is a diagram illustrating a putting green showing various pinhole locations that may be tracked and optimized using the system of FIG. 2 according to an embodiment of the subject matter disclosed herein.

FIG. 3 is a diagram illustrating a putting green 300 showing various pinhole locations that may be tracked and optimized using the system of FIG. 2 according to an embodiment of the subject matter disclosed herein. The diagram may further be representative of a screen shot of one or more applications as discussed above. The diagram shows a putting green 300 with four pinhole locations. Three of these pinhole locations 310, 320, and 330 are historical and the fourth one 340 is the current pinhole location. Further, each pinhole location area may include variables that impact the putting green performance used to determine an optimal pinhole placement location. High traffic areas of golfers walking on the putting green impact the stresses and performance of the putting green turf. A high-traffic area could be formed in a radius of approximately six (6) feet around a pinhole. Thus, pinhole location A 310 includes a surrounding high traffic area 311. Pinhole location B 320 includes a surrounding high traffic area 321. Pinhole location C 330 includes a surrounding high traffic area 331. In addition, pinhole location D 340 includes a surrounding high traffic area 341 The high traffic areas may overlap and such overlaps may be considered to be an overused area. The overused area may be marked as an area to limit pinhole placement. The overused area may be classified for several tiers, such as a highest-level overused area, middle-level overused area, or lowest-level overused area based on the overlap frequency. For example, an overlap area 370 is considered to be a highest-level overused area as three highest traffic areas 321, 331, 341 are overlapped. On the other hand, overlap areas 371, 372, 373, 374 are considered to be middle-level overused areas as two highest traffic areas are overlapped. The area outside of the high-traffic areas are considered to be underused areas 380, 381, 382. Using the historical pinhole location and additional historical and current factors such as high-traffic areas, slope of turf, weather, and turf quality conditions, the application may track the data in a local memory in database 350. Further, the historical and current data may be used to optimize a next pinhole location identified as optimized prediction 360.

Figure 4:
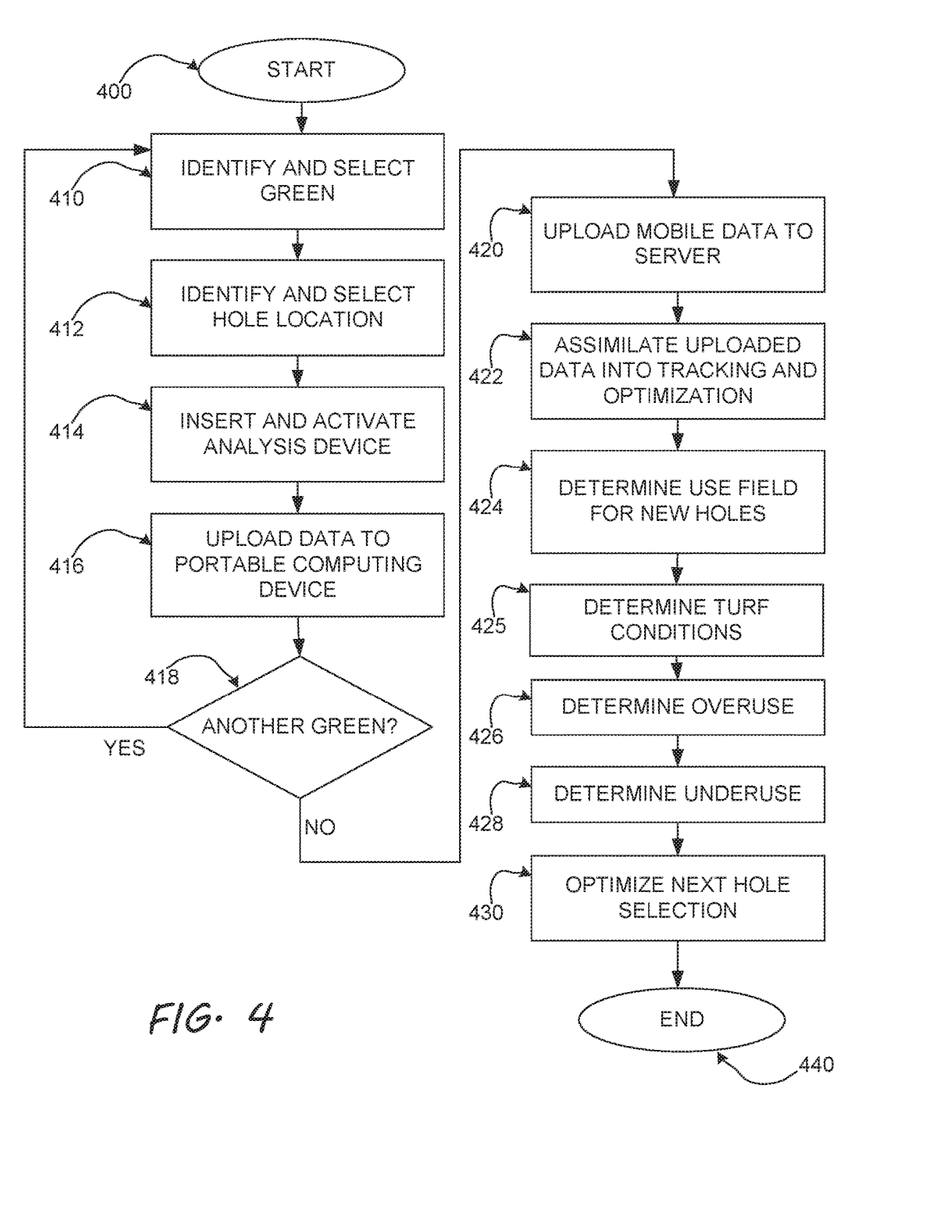
FIG. 4 is a flow chart of a method for keeping track of and optimizing pinhole locations on a putting green according to an embodiment of the subject matter disclosed herein.

FIG. 4 is a flow chart of a method for keeping track of and optimizing pinhole locations on a putting green according to an embodiment of the subject matter disclosed herein. The method starts at 400. A user of a turf analysis device 100 may identify and select a green at 410. Next, the user may activate the turf analysis device 100 at various points on the putting green at 412. Next, the user may identify the current and selected new pinhole location at 414. The device then determines the GPS location of the points in steps 412 and 414. The turf analysis device 100 data is collected by the portable computing device 260 as identified in FIG. 2 at 416.

At 418, a decision may be made to detail additional greens or to upload the data to a server. If there are more greens to collect information used to locate pinholes, steps 410-416 are repeated. If all desired data is collected, then the method moves to step 420 where the locally collected data is uploaded to a server computer that may be executing a cloud-based service. At 421, the newly uploaded data is assimilated into the previously collected historical data about the various golf greens. The cloud-based service may determine current and forecasted weather conditions 422; determine the shape, form, and contour elevations of the green 423; determine high traffic areas 424; determine turf conditions 425; determine overused turf areas 426; and determine underuse of green areas at 428. One element of turf conditions may be quantified using a Turf Stress Index as described in commonly assigned U.S. patent application Ser. No. 15/441,023, entitled "System and Method for Determining Turf Performance Indicator" filed on Feb. 23, 2017, the disclosure of which is incorporated by reference. Other data points to identify are areas for a non-pinhole location, which may include a. provision against position on the green within approximately six feet of the golf green's edge; b. provision against position on a slope greater than three percent; c. provision against position within approximately three-foot radius around a previous pin location in the past user defined number of days. The service enables the user to select an optimal soil moisture and soil salinity level by golf green. The service can use this information to recommend a cup position. For example, one pinhole location may be targeted base on a rotation, but the soil moisture level around that location may to too wet or too dry that may cause the program to recommend another location with better soil conditions for that day and that does not fall within the "no pin" variables above. Another example may be a location with idea soil conditions, but a rain event is forecasted and history indicates that location area becomes excessively saturated with such a rain event. Taking into account all collected and determined data, the cloud-based service may determine an optimal location for placement of the next pin location 430. Such optimal locations and non-pinhole locations may be presented in color-coded layers on a Graphical Information System (GIS) map. The method may end at step 440.

Additional steps may be implemented that utilize additional information such as turf lab analysis or may discount some data because of anomalies. Lab reports for golf course management and/or players can automatically and electronically be provided by any historical date in digital or printed form. Further, visual reference to turf quality and health conditions with layered pin placement can be electronically accessed currently and historically. Such historical results and pin placement changes over time can be animated with a user defined date range. Further, the steps of the method in FIG. 4 may be implemented in any order and not necessarily the order presented in the embodiment of FIG. 4.

Figure 5:
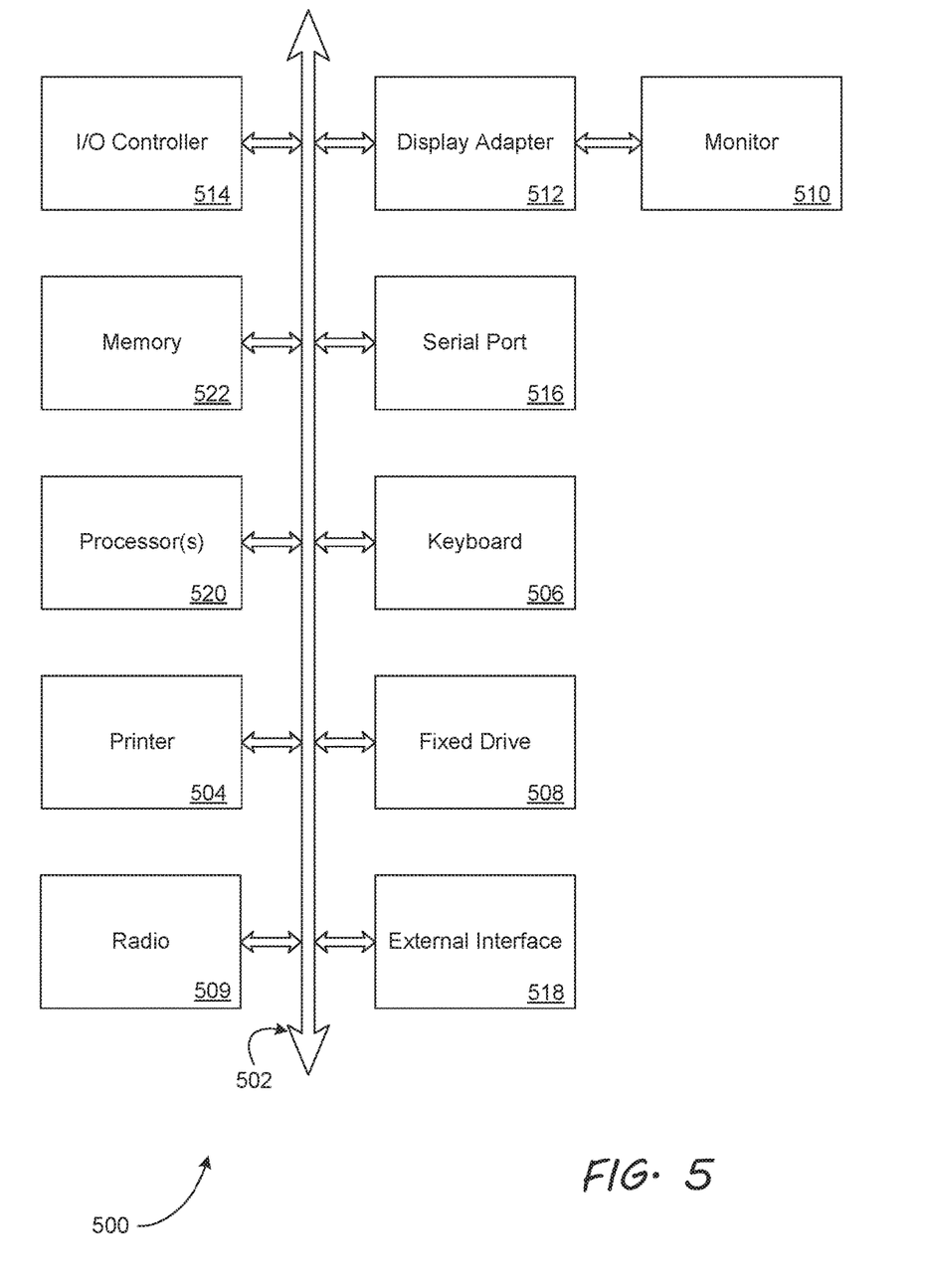
FIG. 5 is a diagram illustrating elements or components that may be present in a computer device or system configured to implement a method, process, function, or operation in accordance with an embodiment of the subject matter disclosed herein.

FIG. 5 is a diagram illustrating various computing elements or components that may be present in a computer device or system 500 configured to implement various computer methods, processes, functions, or operations as discussed above in accordance with various embodiments. Such an exemplary computing device may include the portable computing device 260, personal computing device 280, or server computing device 270 of the embodiments discussed above. The various subsystems shown in FIG. 5 are interconnected via a system bus 502. Additional subsystems may include a printer 504, a keyboard 506, a fixed drive 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and the like. A further communication module that may be present is a radio 509 set to the right frequency to enable communication between the elements and components of the system. The interconnection via the system bus 502 allows one or more processors 520 to communicate with each subsystem and to control the execution of instructions that may be stored in a system memory 522 and/or the fixed drive 508, as well as the exchange of information between subsystems. The system memory 522 and/or the fixed drive 508 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++, PHP, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A system, comprising:
a server computer having a database configured to store historical global position data corresponding to pinholes for one or more greens in a golf course;
a turf analysis device communicatively coupled to the server computer and communicatively coupled to a global-positing satellite system, the device having a sensor configured to measure condition data of each pinhole location and configured to collect global position data for each pinhole location of a green in the golf course;
an analysis processor configured to assimilate the determined global position data received from the turf analysis device and the historical global position data stored at the server computer to determine an optimal pinhole location for each pinhole based on the assimilated pinhole location data; and
an indicator in communication with the analysis processor and configured to indicate to a user the determined optimal pinhole location.

2. The system of claim 1, further comprising a remote computing device communicatively coupled to the turf analysis device, the remote computing device configured to receive the global position data collected from the turf analysis device and to send the global position data to the server.

3. The system of claim 1, further comprising a local computing device communicatively coupled to the server computer and configured to display the collected pinhole location data.

4. The system of claim 1, wherein the server computer is further configured to execute the analysis module to identify one or more high traffic regions for one or more greens corresponding to respective one or more pinhole locations, to identify one or more overlap regions of the high traffic regions for one or more greens corresponding to a respective one or more pinhole locations, to identify one or more non-overlap regions of the high traffic regions, and to determine respective optimal pinhole locations based on the identified high traffic regions, overlap regions and non-overlap regions.

5. The system of claim 4, wherein the server computer is further configured to generate a map of each of the greens in the golf course based on the global position data of the greens in the golf course, to overlay the identified high traffic regions and the previous pinhole locations on the map.

6. The system of claim 1, further comprising a printer communicatively coupled to the server computer and configured to print scorecards showing current pinhole locations of for a golf course.

7. The system of claim 1, wherein the condition data of the pinhole location comprises at least one of soil type, moisture, electric conductivity, humidity and temperature.

8. A turf analysis device, comprising:
an elongated housing having an upper portion and lower portion, the upper portion of the housing comprises a top edge and flat side area, the lower portion of the housing comprises a bottom edge;
a plurality of prongs on the bottom edge of the lower portion of the housing, the plurality of prongs configured to allow the housing to be placed vertically into turf;
a global positioning system module disposed in the device and configured to identify a global position of the housing;
a processor disposed in the device and configured to execute instructions to collect pinhole location data; and
a communication module disposed in the device and configured to communicate the pinhole location data to a remote computer.

9. The turf analysis device of claim 8, wherein the housing comprises a cylindrical shape.

10. The turf analysis device of claim 8, further comprising one or more sensors coupled to one or more of the prongs and configured to collect condition data corresponding to collected pinhole location data.

11. The turf analysis device of claim 10, further comprising a display disposed on an exterior region of the device and configured to display the collected physical data.

12. The turf analysis device of claim 8, further comprising a battery disposed in the device and configured to provide power to components of the device.

* * * * *